US012630254B2

(12) United States Patent
Lv et al.

(10) Patent No.: US 12,630,254 B2
(45) Date of Patent: May 19, 2026

(54) INTELLIGENT FOLDING BICYCLE WITH POWER WHEEL

(71) Applicant: Shenzhen Yicong Intelligence Technology Co., Ltd., Shenzhen (CN)

(72) Inventors: Fuxing Lv, Shenzhen (CN); Yupeng Qiu, Shenzhen (CN); Lingyue Wan, Shenzhen (CN)

(73) Assignee: Shenzhen Yicong Intelligent Technology Co., Ltd., Shenzhen (CN)

( * ) Notice: Subject to any disclaimer, the term of this patent is extended or adjusted under 35 U.S.C. 154(b) by 351 days.

(21) Appl. No.: 18/527,299

(22) Filed: Dec. 3, 2023

(65) Prior Publication Data

US 2025/0065976 A1 Feb. 27, 2025

(30) Foreign Application Priority Data

Aug. 21, 2023 (CN) .......................... 202311049528.3
Aug. 21, 2023 (CN) .......................... 202322239031.X

(51) Int. Cl.
B60L 53/16 (2019.01)
B62J 1/00 (2006.01)
(Continued)

(52) U.S. Cl.
CPC ............ B62K 15/006 (2013.01); B60L 53/16 (2019.02); B62J 1/00 (2013.01); B62J 11/00 (2013.01);
(Continued)

(58) Field of Classification Search
CPC .. B60L 53/16; B62J 43/00; B62J 43/10; B62J 43/13; B62J 43/16; B62J 43/20; B62J 43/23; B62J 43/26; B62J 43/28; B62J 43/30; B62K 15/00; B62K 15/006; B62K 15/008; B62K 25/04; B62K 2015/001;
(Continued)

(56) References Cited

U.S. PATENT DOCUMENTS 4,346,777 A * 8/1982 Restelli .................. B62M 11/16
180/220
4,909,537 A * 3/1990 Tratner ................ B62K 25/005
403/100
(Continued)

FOREIGN PATENT DOCUMENTS

CN 107856795 A 3/2018
CN 109499050 A 3/2019
(Continued)

*Primary Examiner* — Joshua E Rodden
(74) *Attorney, Agent, or Firm* — JEEN IP LAW, LLC

(57) ABSTRACT

Disclosed is an intelligent folding bicycle with a power wheel, including a front frame assembly and a back frame assembly folded through a rotating assembly, a fixing assembly movably arranged between the front frame assembly and the back frame assembly, a front power wheel assembly movably and detachably arranged on the front frame assembly, a back wheel assembly movably arranged on the back frame assembly, a handle assembly arranged above the front frame assembly, a cushion assembly arranged on the back frame assembly, and two pedals movably and symmetrically (Continued)

arranged on the front frame assembly or the back frame assembly, respectively. According to the present invention, functions of detaching the power wheel and folding the bicycle are achieved.

20 Claims, 7 Drawing Sheets

(51) Int. Cl.

| | |
|---|---|
| *B62J 11/00* | (2020.01) |
| *B62J 15/00* | (2006.01) |
| *B62J 43/16* | (2020.01) |
| *B62J 43/28* | (2020.01) |
| *B62K 11/14* | (2006.01) |
| *B62K 15/00* | (2006.01) |
| *B62K 25/04* | (2006.01) |
| *B62L 1/00* | (2006.01) |
| *B62L 3/00* | (2006.01) |
| *B62M 7/12* | (2006.01) |

(52) U.S. Cl.
CPC .............. *B62J 15/00* (2013.01); *B62J 43/16* (2020.02); *B62J 43/28* (2020.02); *B62K 11/14* (2013.01); *B62K 25/04* (2013.01); *B62L 1/00* (2013.01); *B62L 3/00* (2013.01); *B62M 7/12* (2013.01); *B62K 2015/003* (2013.01)

(58) Field of Classification Search
CPC . B62M 6/60; B62M 6/65; B62M 6/90; B62M 7/12
USPC ........................................................ 180/220
See application file for complete search history.

(56) References Cited

U.S. PATENT DOCUMENTS

| | | | | |
|---|---|---|---|---|
| D617,687 | S | * | 6/2010 | Brady ........................... D12/111 |
| 9,039,027 | B2 | * | 5/2015 | Marais ................. B62K 15/006 |
| | | | | 280/287 |
| 9,274,134 | B2 | * | 3/2016 | Lu .............................. B62M 6/40 |
| 10,933,945 | B2 | * | 3/2021 | Lin ......................... B60L 53/16 |
| 11,091,023 | B2 | * | 8/2021 | Yilma .................... H02K 11/00 |
| 11,603,165 | B2 | * | 3/2023 | Ragland ................. B62K 19/40 |
| D1,009,719 | S | * | 1/2024 | Lv ................................. D12/111 |
| D1,090,358 | S | * | 8/2025 | Lv ................................. D12/111 |
| 2006/0175797 | A1 | * | 8/2006 | Sanders .............. B62K 15/006 |
| | | | | 280/287 |
| 2007/0187952 | A1 | * | 8/2007 | Perlo ........................ B62M 6/85 |
| | | | | 290/1 R |
| 2013/0233632 | A1 | * | 9/2013 | Kim ........................ H02K 21/26 |
| | | | | 301/6.5 |
| 2017/0066495 | A1 | * | 3/2017 | Beistegui Chirapozu ................... |
| | | | | B62K 15/008 |
| 2017/0259663 | A1 | * | 9/2017 | Chan .................... B60K 17/046 |
| 2021/0009232 | A1 | * | 1/2021 | Liu ........................ B60B 27/047 |
| 2023/0264780 | A1 | * | 8/2023 | Morozumi ............. B60K 35/10 |
| | | | | 180/90 |
| 2025/0065976 | A1 | * | 2/2025 | Lv ........................... B62K 25/04 |
| 2025/0256561 | A1 | * | 8/2025 | Beal-Brown .......... H02K 21/22 |
| 2026/0028091 | A1 | * | 1/2026 | Zhang ........................ B62J 9/27 |

FOREIGN PATENT DOCUMENTS

| | | | |
|---|---|---|---|
| CN | 216332512 U | 4/2022 | |
| DE | 4000960 A1 * | 7/1991 | .............. B60L 50/66 |
| FR | 3096648 A1 * | 12/2020 | .............. B62M 6/65 |
| KR | 2024134519 A * | 9/2024 | |

* cited by examiner

1531

1534

1532

1533

INTELLIGENT FOLDING BICYCLE WITH POWER WHEEL

CROSS-REFERENCE TO RELATED APPLICATIONS

The application claims priority to Chinese patent application No. 2023110495283 and No. 202322239031X, filed on Aug. 21, 2023, the entire contents of which are incorporated herein by reference.

TECHNICAL FIELD

The present invention relates to the technical field of bicycles, and particularly relates to an intelligent folding bicycle with a power wheel.

BACKGROUND

With the development of the times, a growing number of people start to play attention to environmental issues. Under this circumstance, electric bicycles become a choice for more and more people in daily life. Electric bicycles not only feature energy conservation and environment protection, but also are time-saving and labor-saving. Thanks to small body, lightness and flexibility, the electric bicycles also can alleviate urban road congestion. In a conventional electric bicycle, a power wheel is generally fixedly connected to the body and cannot be sold independently. If a user needs to purchase the electric bicycle, he/she needs to purchase the whole electric bicycle. As a result, the purchase case of the user is high, which causes a certain economic pressure to the user. Moreover, a battery, a controller, and a motor of the conventional electric bicycle are separately designed, so that the whole power wheel is large in size and the power wheel is not suitable for the bicycle or a common electric bicycle. Meanwhile, the conventional electric bicycle cannot be folded, occupies the space comparatively, and is inconveniently transported in a storage box. Therefore, an intelligent folding bicycle with a power wheel is provided to solve the problems that the power wheel of the current electric bicycle is non-detachably connected to the body and the electric bicycle is inconveniently stored and transported.

SUMMARY

One of objects of the present invention is to provide an intelligent folding bicycle with a power wheel to solve the problems that the power wheel of the current electric bicycle is non-detachably connected to the body and the electric bicycle is inconveniently stored and transported.

The intelligent folding bicycle with a power wheel provided by the present invention can be achieved by the following technical solution:

An intelligent folding bicycle with a power wheel provided by the present invention, including a front frame assembly and a back frame assembly folded through a rotating assembly; a fixing assembly movably arranged between the front frame assembly and the back frame assembly; a front power wheel assembly movably and detachably arranged on the front frame assembly, including a front wheel assembly, a driving device, and a connecting device, wherein the front wheel is arranged on an outer side of the driving device, the connecting device is arranged on the driving device and is detachably connected to the front frame assembly, the driving device comprises a rotating shaft, a motor main body, a circuit board, a plurality of battery cell packs, and two end caps, both ends of the rotating shaft are respectively arranged on the connecting device, the motor main body is arranged on the rotating shaft in a penetrating manner, the circuit board and the plurality of battery cell packs are fixedly and integrally arranged in the motor main body, respectively, the circuit board is provided with a wireless communication module, and the two end caps are respectively arranged at both ends of the motor main body and are arranged on the rotating shaft in a penetrating manner; a back wheel assembly movably arranged on the back frame assembly; a handle assembly arranged above the front frame assembly; a cushion assembly arranged on the back frame assembly, wherein a height of the cushion assembly can be adjusted; and two pedals movably and symmetrically arranged on the front frame assembly or the back frame assembly, respectively.

In one of implementation modes, the fixing assembly includes two fixing rods and a fixing piece; the two fixing rods are fixedly arranged at corresponding positions of the front frame assembly and the back frame assembly, respectively; and the fixing piece is detachably connected to the two fixing rods.

In one of implementation modes, the front wheel includes a wheel hub and a tire main body; the wheel hub is a supporting main body; and the tire main body encircles an outer side of the wheel hub, and the driving device is arranged on an inner side of the wheel hub.

In one of implementation modes, one of ports of the rotating shaft is provided with a charging interface in a penetrating manner, the charging interface is electrically connected to the circuit board, and the charging interface is detachably provided with a charging hole plug.

In one of implementation modes, the motor main body includes a stator assembly and a rotor assembly, the stator assembly and the rotor assembly are respectively arranged on the rotating shaft in a penetrating manner, and the rotor assembly is connected to the rotating shaft through a bearing; and the stator assembly includes a stator carrier fixedly arranged on the wheel hub, and the plurality of battery cell packs and the circuit board are fixedly arranged on the stator carrier.

In one of implementation modes, the stator carrier further includes a stator core and a stator winding, wherein the stator winding is arranged on the stator core; the stator carrier includes a support frame, a fixing ring arranged on an outer side of the stator carrier, and a shaft sleeve ring arranged on an inner side of the stator carrier; the support frame is connected to the shaft sleeve ring and the fixing ring, the stator core is arranged on the fixing ring, the stator carrier is fixed on the rotating shaft through the shaft sleeve ring, and the support frame is uniformly provided with a plurality of mounting positions where the plurality of battery cell packs are mounted at an interval in a circumferential direction of the rotating shaft.

In one of implementation modes, the rotor assembly includes rotor carriers and a rotor sleeve ring, each of the rotor carriers is arranged on the rotating shaft through the bearing, an inner side of the rotor sleeve ring is uniformly provided with permanent magnets at an interval in a circumferential direction, the stator winding is matched with the positions of the permanent magnets, and the rotor carriers are fixedly arranged on both sides of the rotor sleeve ring.

In one of implementation modes, the connecting device includes a connecting tube, two damping pieces, two connecting rods, and a mudguard; the connecting tube is detachably connected to the front frame assembly; the two damping pieces are respectively arranged at a lower end of the connecting tube; the two connecting rods are fixedly arranged below the corresponding damping pieces, respectively, and are respectively connected to both ends of the rotating shaft; and the mudguard is fixedly arranged on the two connecting rods and is arranged above the tire main body.

In one of implementation modes, the front power wheel assembly and the back wheel assembly are respectively provided with disc brakes; and the two disc brakes are respectively connected to the handle assembly.

In one of implementation modes, damping pieces are arranged between the back wheel assembly and the back frame assembly; and an adjusting lock body is arranged in a part where the cushion assembly and the back frame assembly are connected.

Compared with the prior art, the intelligent folding bicycle with a power wheel provided by the present invention has the following beneficial effects:

according to the intelligent folding bicycle with a power wheel provided by the present invention, the two frame assemblies are folded through the rotating assembly, and meanwhile, the battery cell packs and the circuit boards are integrated in the front power wheel assembly, so that the bicycle is compact in structure; then, the front power wheel assembly is detachably connected to the front frame assembly to solve the problems that the power wheel of the current electric bicycle is non-detachably connected to the body and the electric bicycle is inconveniently stored and transported;

according to the intelligent folding bicycle with a power wheel provided by the present invention, the plurality of battery cell packs are respectively arranged on the stator assembly, so that the stator assembly and the plurality of battery cell packs are integrated together, and the overall structure of the motor is more compact, and thus, the overall size of the motor is further reduced; furthermore, the plurality of battery cell packs are arranged on the stator carrier, which effectively guarantees that the plurality of battery cell packs are integrated in the motor while normal rotation of the motor is not affected, so that good protection is further provided for the plurality of battery cell packs, and the service safety of the motor is better guaranteed; and at the same time, the stator assembly and the plurality of battery cell packs are integrally arranged, so that accessories and wires of the motor are more concisely arranged, and therefore, production and machining of the motor are further facilitated.

BRIEF DESCRIPTION OF DRAWINGS

In order to describe the technical solution of the embodiments of the present invention more clearly, the drawings needed to be used in the embodiment will be briefly introduced below. It is to be understood that the drawings described below are merely some embodiments of the present invention, and therefore, shall not be viewed as limitation to the scope. Those of ordinary skill in the art can further obtain other relevant drawings according to the drawings without making creative efforts.

Figure 1:
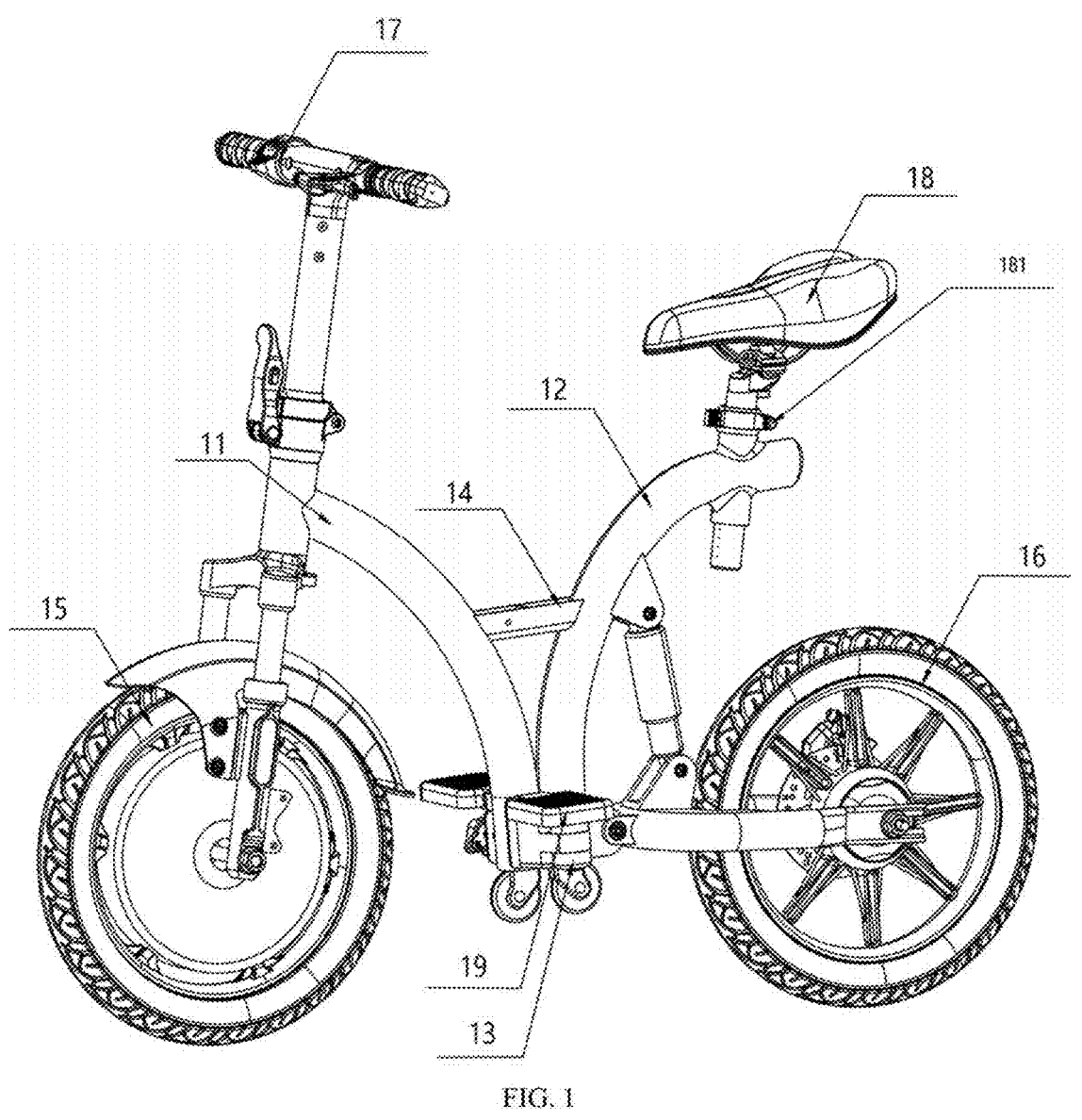
FIG. 1 is a structural schematic diagram of an intelligent folding bicycle with a power wheel provided by the present invention, including a front power wheel assembly.

Numerals in the drawings: 11, front frame assembly; 12, back frame assembly; 13, rotating assembly; 14, fixing assembly; 141, fixing rod; 142, fixing piece; 15, front power wheel assembly; 151, front wheel; 1511, wheel hub; 1512, tire main body; 15121, anti-skid piece; 152, driving device; 1521, rotating shaft; 15211, charging bole plug; 1522, motor main body; 1523, circuit board; 1524, battery cell pack; 1525, end cap; 1526, disc brake; 153, connecting assembly; 1531, connecting tube; 1532, damping piece; 1533, connecting rod; 1534, mudguard; 16, back wheel assembly; 17, handle assembly; 18, cushion assembly; 181, adjusting lock body; 19, pedal.

DETAILED DESCRIPTION OF THE EMBODIMENTS

In order to make objectives, technical solutions and advantages of the embodiments of the present invention clearer, description will be made on technical solution in the embodiment of the present invention below in combination with drawings in the embodiment of the present invention. It is apparent that the described embodiments are a part of embodiments of the present invention rather than all the embodiments. Components in the embodiments of the present invention described and illustrated in the drawings herein may usually be arranged and designed in various different configurations.

Therefore, detailed description on the embodiments of the application provided in the drawings is not intended to limit the scope of the present invention claimed, and merely represents selected embodiments of the present invention. On the basis of the embodiments in the present invention, all other embodiments obtained by those skilled in the technical field without making creative efforts fall into the scope of protection of the present invention.

Figure 2:
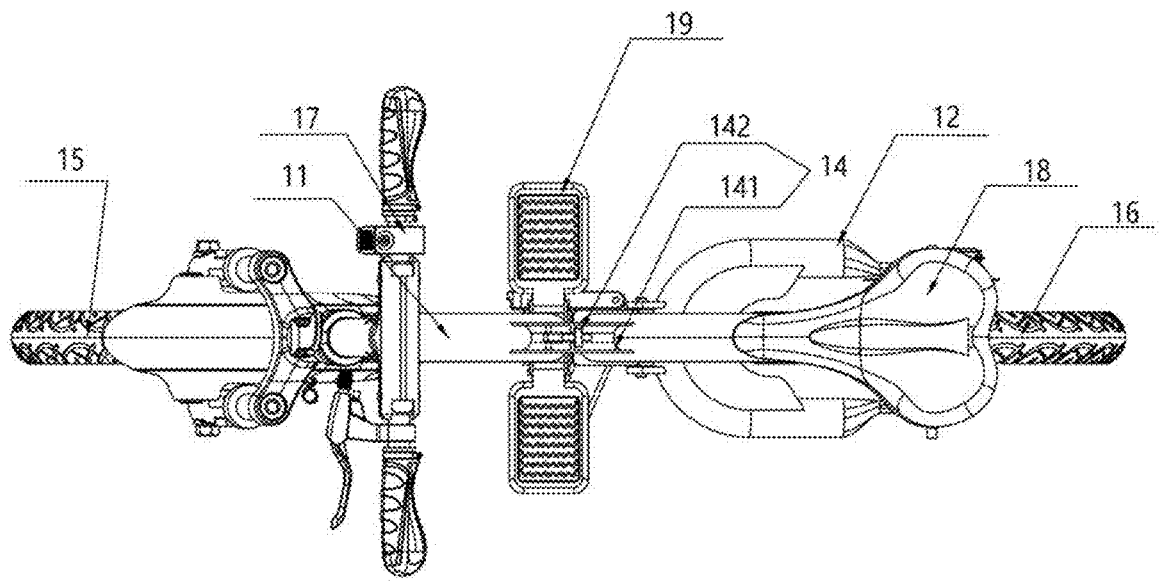
FIG. 2 is a top view structural schematic diagram of the intelligent folding bicycle with a power wheel provided by the present invention, as shown in FIG. 1.
Figure 3:
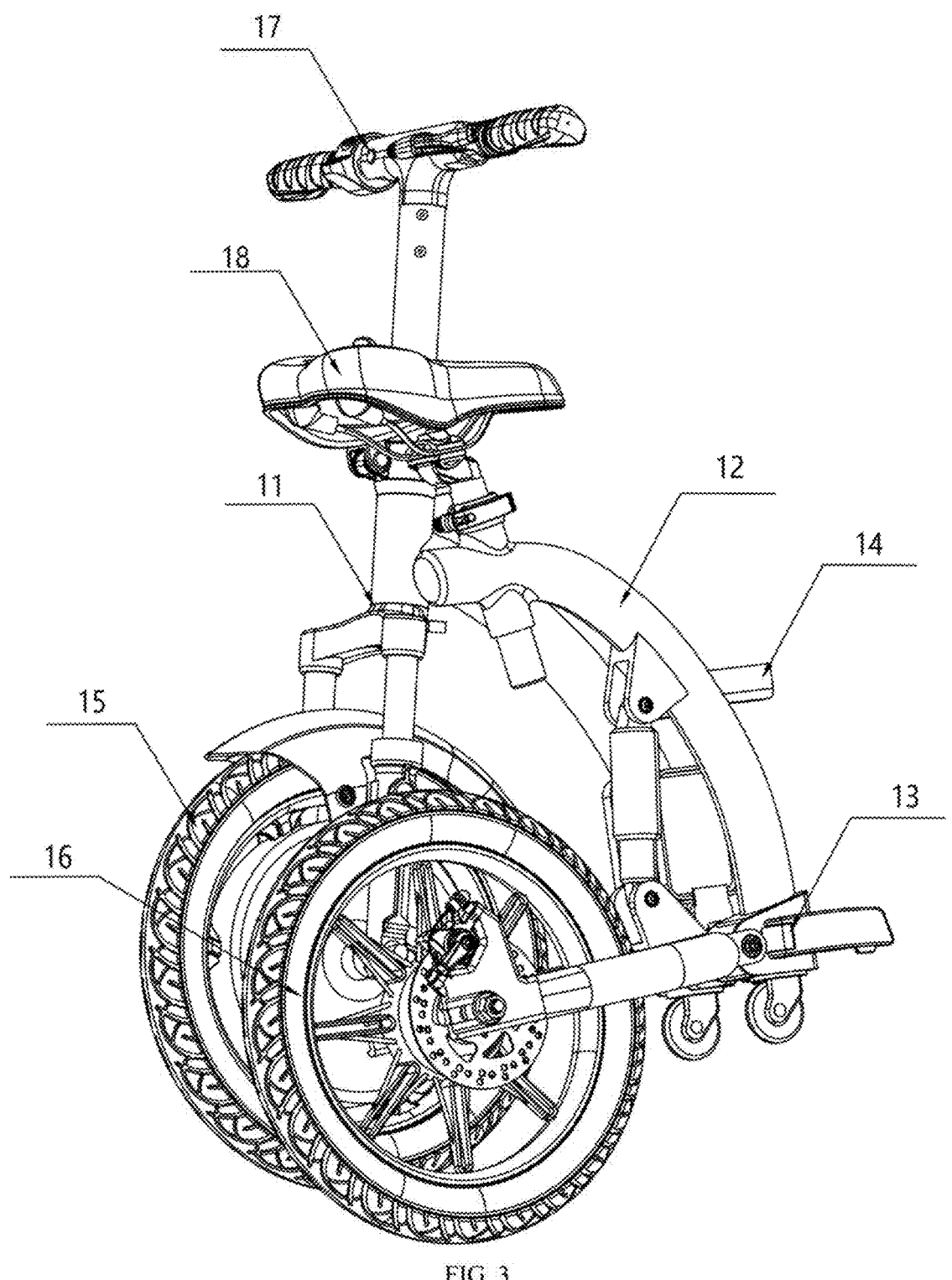
FIG. 3 is a structural schematic diagram of the intelligent folding bicycle with a power wheel provided by the present invention in a folded state, as shown in FIG. 1.

Referring to FIGS. 1-3, an intelligent folding bicycle with a power wheel provided by the present invention can include a front frame assembly 11, a back frame assembly 12, a rotating assembly 13, fixing assembly 14, a front power wheel assembly 15, a back wheel assembly 16, a handle assembly 17, a cushion assembly 18, and two pedals 19, wherein the front frame assembly 11 and the back frame assembly 12 are folded through the rotating assembly 13, so that the space occupied by the bicycle is reduced, and the bicycle is conveniently stored and transported; the fixing assembly 14 is movably arranged between the front frame assembly 11 and the back frame assembly 12, and the fixing assembly fixes and supports the relatively unfolded front frame assembly 11 and back frame assembly 12; the front power wheel assembly 15 is movably arranged on the front frame assembly 11 to drive the back wheel assembly 16 to move; the back wheel assembly 16 is movably arranged on the back frame assembly 12 and moves following the front power wheel assembly 15; the handle assembly 17 is arranged above the front frame assembly 11 to control a direction of the bicycle; the cushion assembly 18 is arranged on the back frame assembly 12, wherein a height of the cushion assembly can be adjusted; and two pedals 19 are movably and symmetrically arranged on the front frame assembly 11 or the back frame assembly 12, respectively. In the embodiment, the two pedals 19 are movably and symmetrically arranged on the front frame assembly 11, respectively.

Referring to FIGS. 1-3, in the embodiment, the rotating shaft assembly 13 is of a conventional rotating shaft structure, so the specific rotating speed and specific structure thereof are not repeatedly described here as long as they satisfy the application; the fixing assembly 14 includes two fixing rods 141 and a fixing piece 142, wherein the two fixing rods 141 are fixedly arranged at corresponding positions of the front frame assembly 11 and the back frame assembly 12, respectively; the fixing piece 142 is detachably connected to the two fixing rods 141; and when the bicycle is unfolded, the fixing piece 142 fixes and supports the two fixing rods 141.

Figure 4:
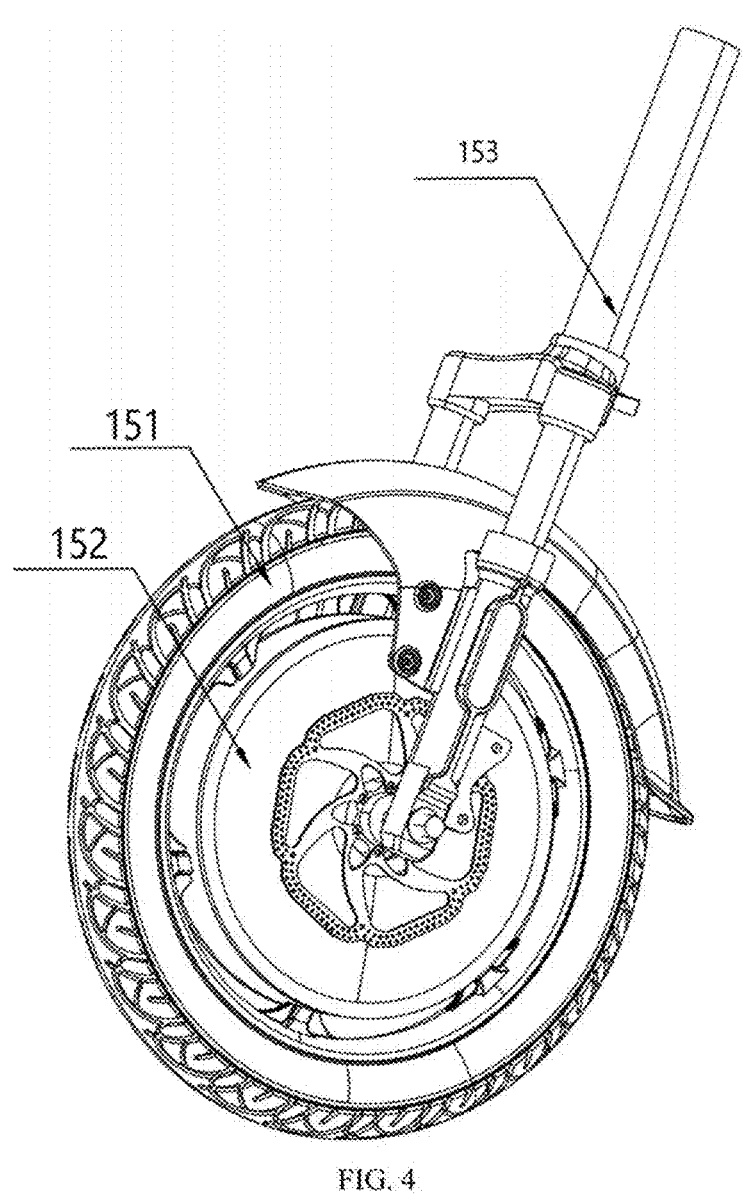
FIG. 4 is a structural schematic diagram of the front power wheel assembly in the intelligent folding bicycle with a power wheel provided by the present invention, as shown in FIG. 1.
Figure 5:
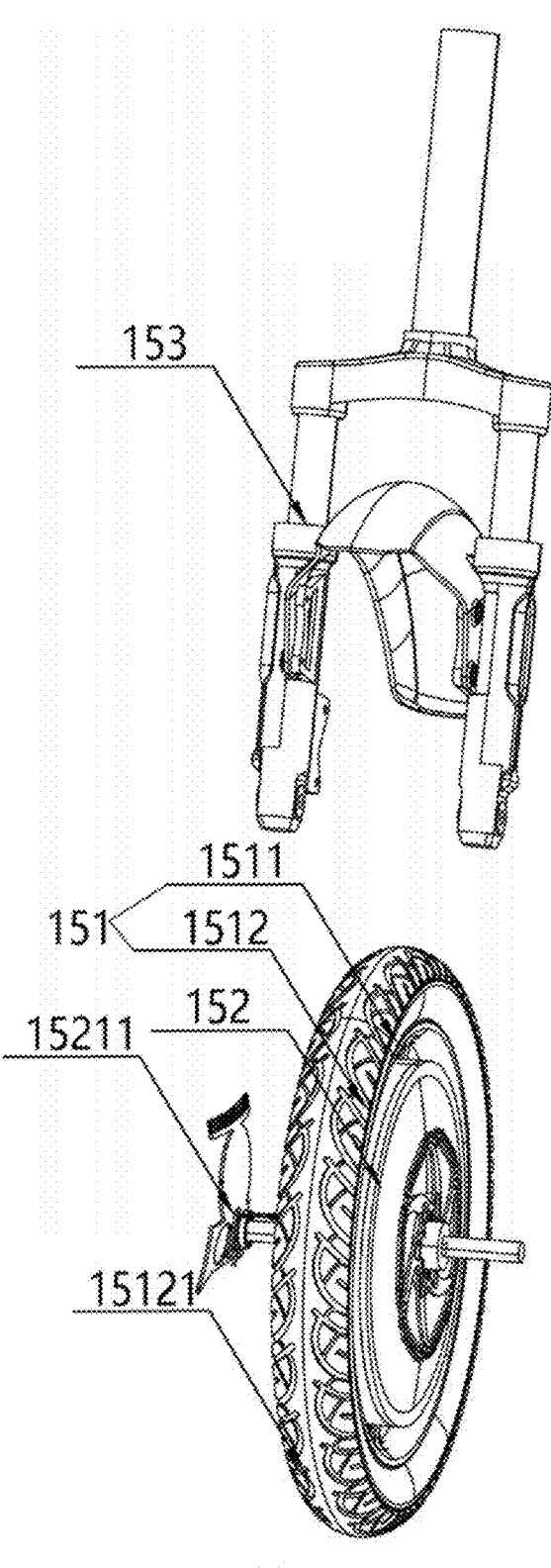
FIG. 5 is a partially exploded structural schematic diagram of the front power wheel assembly shown in FIG. 4, including a front wheel, a driving device, and a connecting device.

Referring to FIG. 4 and FIG. 5, in the embodiment, the front power wheel assembly 15 includes a front wheel 151, a driving device 152, and a connecting device 153; the front wheel 151 is arranged on an outer side of the driving device 152, the driving device 152 drives the front wheel 151 to rotate, the connecting device 153 is arranged on the driving device 152 and is detachably connected to the front frame assembly 11.

Figure 6:
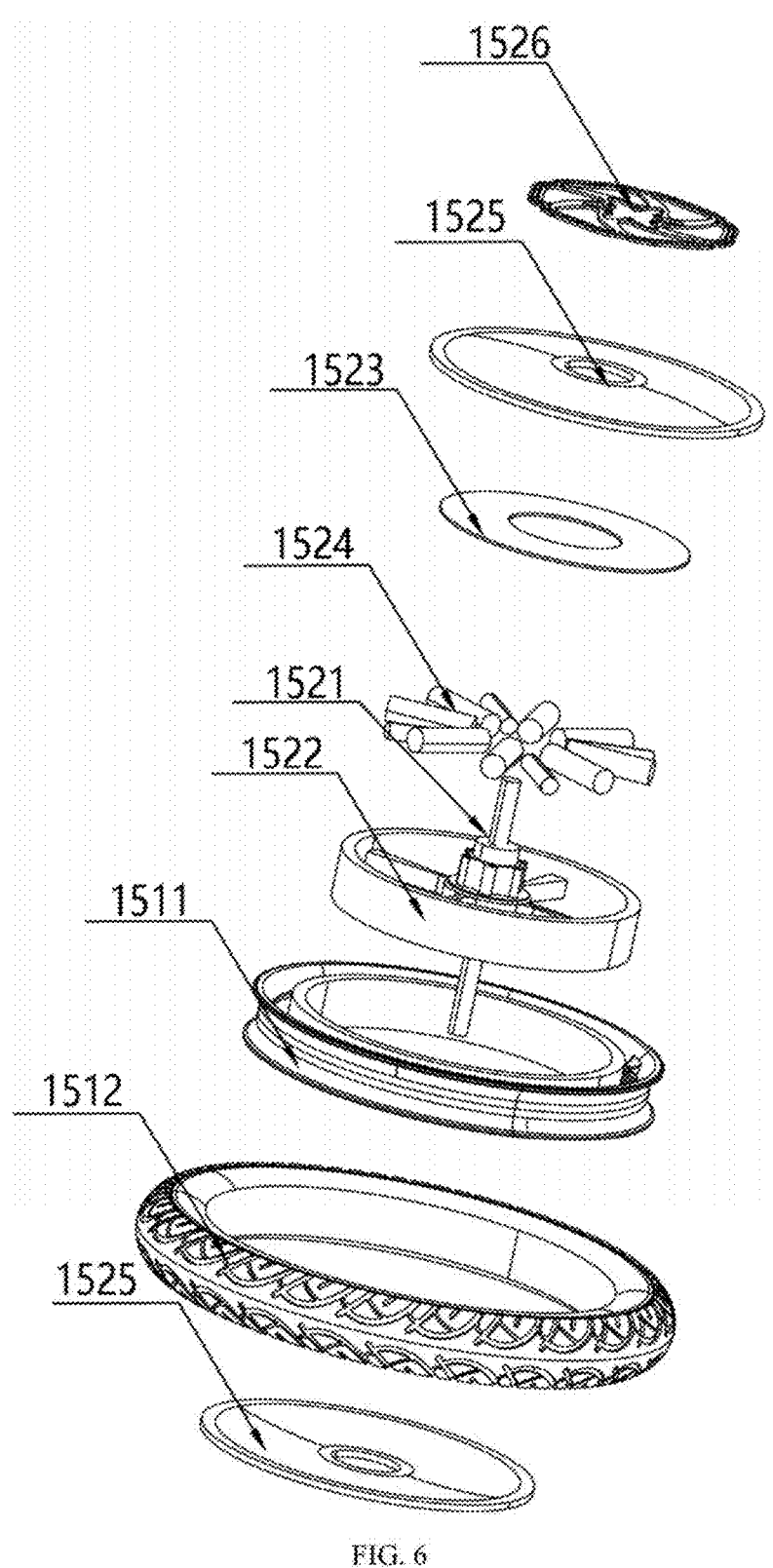
FIG. 6 is an exploded structural schematic diagram of the front wheel and the driving device shown in FIG. 5.

Referring to FIGS. 4-6, in the embodiment, the front wheel 151 includes a wheel hub 1511 and a tire main body 1512, wherein the wheel hub 1511 is a supporting main body; the tire main body 1512 encircles an outer side of the wheel hub 1511, and the driving device 152 is arranged on an inner side of the wheel hub 1511; the tire main body 1512 is uniformly provided with a plurality of anti-skid pieces 15121, and a friction force between the tire main body 1512 and the ground is increased through the plurality of anti-skid pieces 15121; and specifically, each of the anti-skid pieces 15121 can be a salient point or a stripe. In the embodiment, the anti-skid piece 15121 is the stripe.

Referring to FIG. 5 and FIG. 6, in the embodiment, the driving device 152 includes a rotating shaft 1521, a motor main body 1522, a circuit board 1523, the plurality of battery cell packs 1524, two end caps 1525, and disc brakes 1526, wherein both ends of the rotating shaft 1521 are respectively arranged on the connecting device 153; the motor main body 1522 is arranged on the rotating shaft 1521 in a penetrating manner, and drives the rotating shaft 1521 to rotate; the circuit board 1523 and the plurality of battery cell packs 1524 are fixedly and integrally arranged in the motor main body 1522, respectively, the circuit board 1523 is electrically connected to the motor main body 1522 and the plurality of battery cell packs 1524, respectively, and the plurality of battery cell packs 1524 provide the motor main body 1522 with electric energy; and the two end caps 1525 are respectively arranged at both ends of the motor main body 1522 and are respectively arranged on the rotating shaft 1521 in a penetrating manner, the two end caps and the motor main body 1522 form a closed cavity, and the circuit board 1523 and the plurality of battery cell packs 1524 are arranged in the cavity; each of the disc brakes 1526 is arranged on the rotating shaft 1521 in a penetrating manner, and is arranged at a side edge of one of the end caps 1525; and the disc brake 1526 is connected to the handle assembly 17.

Referring to FIG. 5 and FIG. 6, in the embodiment, one of ports of the rotating shaft 1521 is provided with a charging interface in a penetrating manner, and the charging interface is electrically connected to the circuit board 1523. To improve the water resistance of the charging interface, the charging interface is detachably provided with a charging hole plug 15211. Specifically, the charging hole plug 15211 is a silica gel plug. In the embodiment, the motor main body 1522 includes a stator assembly and a rotor assembly, the stator assembly and the rotor assembly are respectively arranged on the rotating shaft 1521 in a penetrating manner, and the rotor assembly is connected to the rotating shaft 1521 through a bearing; the stator assembly includes a stator carrier, the stator carrier is fixedly arranged on the wheel hub 1511, the plurality of battery cell packs 1524 and the circuit board 1523 are fixedly arranged on the stator carrier, and by fixedly arranging the plurality of battery cell packs 1524 and the circuit board 1523 on the rotor assembly, the stator assembly, the circuit board 1523, and the plurality of battery cell packs 1524 are integrated, so that the overall structure of the driving device 152 is more compact, and the overall size of the driving device 152 is further reduced; furthermore, the plurality of battery cell packs 1524 are arranged on the stator carrier, which effectively guarantees that the plurality of battery cell packs 1524 are integrated in the motor main body 1522 while normal rotation of the motor main body 1522 is not affected, so that good protection is further provided for the plurality of battery cell packs 1524, and the service safety of the driving device 152 is better guaranteed; and at the same time, the stator assembly and the plurality of battery cell packs 1524 are integrally arranged, so that accessories and wires of the motor are more concisely arranged, and therefore, production and machining of the motor are further facilitated.

The stator assembly further includes a stator core and a stator winding; the stator winding is arranged on the stator core; the stator carrier includes a support frame, a fixing ring arranged on an outer side of the stator carrier, and a shaft sleeve ring arranged on an inner side of the stator carrier; the support frame is connected to the shaft sleeve ring and the fixing ring; the stator core is arranged on the fixing ring, the stator carrier is fixed on the rotating shaft 1521 through the shaft sleeve ring, the support frame is uniformly provided with a plurality of mounting positions where the plurality of battery cell packs 1524 are mounted at an interval in a circumferential direction of the rotating shaft 1521, and arrangement of the mounting positions facilitates mounting of the plurality of battery cell packs 1524, so that the plurality of battery cell packs 1524 can be mounted on the stator assembly well. Integration not only can better satisfy the service demand and the production demand, but also can further provide good protection to the plurality of battery cell packs 1524. Moreover, the mounting positions are arranged in the form of through holes, so that the overall structure of the motor is more compact, and thus, the overall size and weight of the stator assembly can be further reduced, and therefore, the overall driving device 152 is more convenient; at the same time, the mounting positions are arranged at an interval uniformly, so that when the plurality of battery cell packs 1524 are arranged in a fit manner at the corresponding mounting positions, the weight of the stator assembly encircling the circumferential direction of the rotating shaft 1521 is distributed more uniformly without affecting normal operation of the motor.

The rotor assembly includes rotor carriers and a rotor sleeve ring, wherein each of the rotor carriers is arranged on the rotating shaft 1521 through the bearing, an inner side of the rotor sleeve ring is uniformly provided with permanent magnets at an interval in a circumferential direction, the stator winding is matched with the positions of the permanent magnets, the rotor carriers are fixedly arranged on both sides of the rotor sleeve ring, and the rotor carriers and the rotor sleeve ring are fixedly connected to form a sound overall structure, so as to further provide good protection to the plurality of battery cell packs 1524 and the stator assembly. The rotor sleeve ring and the rotor carriers are generally of a metal structure, which can better provide protection to the plurality of battery cell packs 1524 and the stator assembly. The circuit board 1523 is electrically connected to the motor main body 1522, the battery cell packs 1524, and the charging interface, respectively. Control techniques adopted all are prior art, so the specific control process and product model are not repeatedly described here as long as they satisfy the application. The circuit board 1523 is provided with a wireless communication module and is wirelessly connected to a remote controller through the wireless communication module, so as to control the front power wheel assembly 15. Specifically, the wireless communication module is a Bluetooth wireless communication module. The control technique adopted by the remote controller is also the prior art, so the specific control process and product model are not repeatedly described here as long as they satisfy the application.

Figure 7:
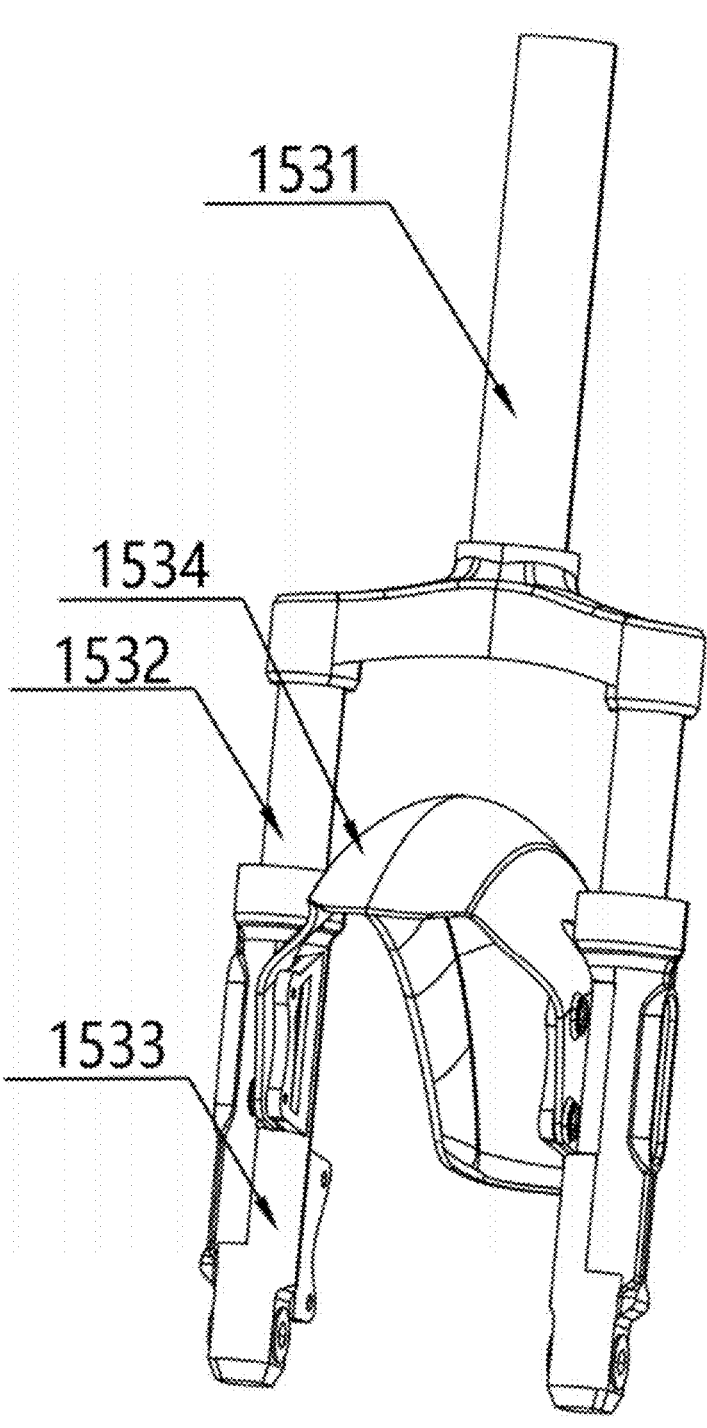
FIG. 7 is a structural schematic diagram of the connecting device shown in FIG. 5.

Referring to FIG. 7, in the embodiment, the connecting device 153 includes a connecting tube 1531, two damping pieces 1532, two connecting rods 1533, and a mudguard 1534; the connecting tube 1531 is detachably connected to the front frame assembly 11; the two damping pieces 1532 are respectively arranged at a lower end of the connecting tube 1531 to buffer jolts in the driving process of the bicycle; the two connecting rods 1533 are fixedly arranged below the corresponding damping pieces 1532, respectively, and are respectively connected to both ends of the rotating shaft 1521; and the mudguard 1534 is fixedly arranged on the two connecting rods 1533 and is arranged above the tire main body 1512.

Referring to FIGS. 1-3, in the embodiment, to improve the damping function of the bicycle, the damping pieces are arranged between the back wheel assembly 16 and the back frame assembly 12, and the back wheel assembly 16 is also provided with the disc brake 1526; the handle assembly 17 is provided with a bell and a brake handle, and the brake handle is connected to the corresponding disc brake 1526 through a brake cable. In some embodiments, the handle assembly 17 can further be provided with a mobile phone bracket, and a mobile phone is fixedly arranged on the handle assembly 17 through the mobile phone bracket. In the embodiment, an adjusting lock body 181 is arranged at a part where the cushion assembly 18 and the back frame assembly 12 are connected, and a height of the cushion assembly 18 can be adjusted through the adjusting lock body 181 according to the actual demand of the user. When the bicycle is folded, the two pedals 19 can be folded relative to the front frame assembly 11, so as to reduce the space occupied by the pedals 19 to a certain extent.

It is to be noted that according to the intelligent folding bicycle with a power wheel, the front frame assembly 11 and the back frame assembly 12 are folded through the rotating assembly 13, so that the space occupied by the bicycle is reduced, and the bicycle is conveniently stored and transported; meanwhile, the two pedals 19 can be folded relative to the front frame assembly 11; the connecting tube 1531 is detachably connected to the front frame assembly 11; the plurality of battery cell packs 1524 provide the motor main body 1522 with electric energy, the remote controller is wirelessly connected to the circuit board 1523, and the remote controller controls the motor main body 1522 to work, so as to drive the front wheel 151 to move, so that the back wheel assembly 16 moves following the front power wheel assembly 15.

The technical features of the above embodiments may be combined freely. In order to describe briefly, the description is not made on all possible combinations of the technical features of the embodiments. However, the combinations of these technical features should be considered as a scope of the specification as long as there is no contradiction.

The above embodiments only express several embodiments of the present invention, are described in more detail, but are not to be construed as a limitation to the scope of the applied patent. It shall be pointed out that several variations and modifications may also be made by those of ordinary skill in the art without departing from the spirit of the present invention, which all fall within the protection scope of the present invention. Therefore, the scope of protection of the patent for the present invention shall be subject to the appended claims.

What is claimed is:

1. An intelligent folding bicycle with a power wheel, comprising a front frame assembly and a back frame assembly configured to be folded through a rotating assembly:

a fixing assembly, movably arranged between the front frame assembly and the back frame assembly, wherein the fixing assembly fixes and supports the front frame assembly and back frame assembly when unfolded;

a front power wheel assembly, movably and detachably arranged on the front frame assembly, wherein the front power wheel assembly comprises a front wheel, a driving device, and a connecting device; the front wheel is arranged on an outer side of the driving device, and the driving device drives the front wheel to rotate; the connecting device is arranged on the driving device and is detachably connected to the front frame assembly; the driving device comprises a rotating shaft, a motor main body, a circuit board, a plurality of battery cell packs, and two end caps: both ends of the rotating shaft are respectively arranged on the connecting device; the motor main body is arranged on the rotating shaft in a penetrating manner, and drives the rotating shaft to rotate; the circuit board and the plurality of battery cell packs are fixedly and integrally arranged in the motor main body, respectively, the circuit board is provided with a wireless communication module and is wirelessly connected to a remote controller through the wireless communication module to control the front power wheel assembly, and the plurality of battery cell packs provide the motor main body with electric energy; and the two end caps are respectively arranged at both ends of the motor main body and are respectively arranged on the rotating shaft in a penetrating manner, the two end caps and the motor main body form a closed cavity, and the circuit board and the plurality of battery cell packs are arranged in the cavity;

a back wheel assembly, movably arranged on the back frame assembly, wherein the back wheel assembly moves following the front power wheel assembly;

a handle assembly, arranged above the front frame assembly, wherein the handle assembly controls a direction of the bicycle;

a cushion assembly, arranged on the back frame assembly, wherein a height of the cushion assembly is configured to be adjusted; and two pedals, movably and symmetrically arranged on the front frame assembly or the back frame assembly, respectively.

2. The intelligent folding bicycle with a power wheel according to claim 1, wherein the fixing assembly comprises two fixing rods and a fixing piece; the two fixing rods are fixedly arranged at corresponding positions of the front frame assembly and the back frame assembly, respectively; the fixing piece is detachably connected to the two fixing rods; and when the bicycle is unfolded, the fixing piece fixes and supports the two fixing rods.

3. The intelligent folding bicycle with a power wheel according to claim 1, wherein the front wheel comprises a wheel hub and a tire main body; the wheel hub is a supporting main body; and the tire main body encircles an outer side of the wheel hub, and the driving device is arranged on an inner side of the wheel hub.

4. The intelligent folding bicycle with a power wheel according to claim 3, wherein the tire main body is uniformly provided with a plurality of anti-skid pieces, and a friction force between the tire main body and ground is increased through the plurality of anti-skid pieces.

5. The intelligent folding bicycle with a power wheel according to claim 4, wherein each of the anti-skid pieces is a salient point or a stripe.

6. The intelligent folding bicycle with a power wheel according to claim 3, wherein the motor main body comprises a stator assembly and a rotor assembly, the stator assembly and the rotor assembly are respectively arranged on the rotating shaft in a penetrating manner, and the rotor assembly is connected to the rotating shaft through a bearing.

7. The intelligent folding bicycle with a power wheel according to claim 6, wherein the stator assembly comprises a stator carrier, the stator carrier is fixedly arranged on the wheel hub, the plurality of battery cell packs and the circuit board are fixedly arranged on the stator carrier, and the stator assembly, the circuit board, and the plurality of battery cell packs are integrated, so that an overall structure of the driving device is more compact.

8. The intelligent folding bicycle with a power wheel according to claim 7, wherein the stator assembly further comprises a stator core and a stator winding; and the stator winding is arranged on the stator core.

9. The intelligent folding bicycle with a power wheel according to claim 8, wherein the stator carrier comprises a support frame, a fixing ring arranged on an outer side of the stator carrier, and a shaft sleeve ring arranged on an inner side of the stator carrier; the support frame is connected to the shaft sleeve ring and the fixing ring; and the stator core is arranged on the fixing ring, the stator carrier is fixed on the rotating shaft through the shaft sleeve ring, the support frame is uniformly provided with a plurality of mounting positions where the plurality of battery cell packs are mounted at an interval in a circumferential direction of the rotating shaft, and arrangement of the mounting positions facilitates mounting of the plurality of battery cell packs, so that the plurality of battery cell packs are configured to be mounted on the stator assembly.

10. The intelligent folding bicycle with a power wheel according to claim 9, wherein the rotor assembly comprises rotor carriers and a rotor sleeve ring, each of the rotor carriers is arranged on the rotating shaft through the bearing, an inner side of the rotor sleeve ring is uniformly provided with permanent magnets at an interval in a circumferential direction, the stator winding is matched with the positions of the permanent magnets, the rotor carriers are fixedly arranged on both sides of the rotor sleeve ring, and the rotor carriers and the rotor sleeve ring are fixedly connected.

11. The intelligent folding bicycle with a power wheel according to claim 3, wherein the connecting device comprises a connecting tube, two damping pieces, two connecting rods, and a mudguard; the connecting tube is detachably connected to the front frame assembly; the two damping pieces are respectively arranged at a lower end of the connecting tube to buffer jolts in a driving process of the bicycle; the two connecting rods are fixedly arranged below the corresponding damping pieces, respectively, and are respectively connected to both ends of the rotating shaft and the mudguard is fixedly arranged on the two connecting rods and is arranged above the tire main body.

12. The intelligent folding bicycle with a power wheel according to claim 1, wherein the driving device further comprises a disc brake, arranged on the rotating shaft in a penetrating manner and arranged at a side edge of one of the end caps, and the disc brake is connected to the handle assembly; and the back wheel assembly is also provided with another disc brake.

13. The intelligent folding bicycle with a power wheel according to claim 12, wherein the handle assembly is provided with a bell and a brake handle, the brake handle is connected to the corresponding disc brake through a brake cable, and the brake handle is matched with the disc brake to perform a brake operation.

14. The intelligent folding bicycle with a power wheel according to claim 13, wherein the handle assembly is further provided with a mobile phone bracket, and a mobile phone is configured to be fixedly arranged on the handle assembly through the mobile phone bracket.

15. The intelligent folding bicycle with a power wheel according to claim 1, wherein the rotating shaft is provided with a charging interface in a penetrating manner, and the plurality of battery cell packs are charged through the charging interface.

16. The intelligent folding bicycle with a power wheel according to claim 15, wherein the charging interface is detachably provided with a charging hole plug capable of enhancing water resistance of the charging interface.

17. The intelligent folding bicycle with a power wheel according to claim 1, wherein the wireless communication module is a Bluetooth® wireless communication module, and the Bluetooth® wireless communication module is wirelessly connected to the remote controller to control the front power wheel assembly.

18. The intelligent folding bicycle with a power wheel according to claim 1, wherein damping pieces are arranged between the back wheel assembly and the back frame assembly, and a damping function of the bicycle is enhanced through the damping pieces.

19. The intelligent folding bicycle with a power wheel according to claim 1, wherein an adjusting lock body is arranged where the cushion assembly and the back frame assembly are connected, and the height of the cushion assembly is adjusted through the adjusting lock body.

20. The intelligent folding bicycle with a power wheel according to claim 1, wherein the two pedals are configured to be folded relative to the front frame assembly when the bicycle is folded.

* * * * *